P. D. HAY.
LIQUID TRAP.
APPLICATION FILED MAY 5, 1910.

1,075,254.

Patented Oct. 7, 1913.

UNITED STATES PATENT OFFICE.

PETER D. HAY, OF DETROIT, MICHIGAN, ASSIGNOR TO DETROIT SANITARY SUPPLY COMPANY, OF DETROIT, MICHIGAN.

LIQUID-TRAP.

1,075,254.  Specification of Letters Patent.  Patented Oct. 7, 1913.

Application filed May 5, 1910. Serial No. 559,551.

*To all whom it may concern:*

Be it known that I, PETER DAVID HAY, a citizen of the United States, residing at Detroit, county of Wayne, State of Michigan, have invented a certain new and useful Improvement in Liquid-Traps, and declare the following to be a full, clear, and exact description of the same, such as will enable others skilled in the art to which it pertains to make and use the same, reference being had to the accompanying drawings, which form a part of this specification.

My invention relates to liquid traps such as are used as the outlet of basins, closets, sinks, etc., and consists in the improvements hereinafter described and claimed.

Figure 1:
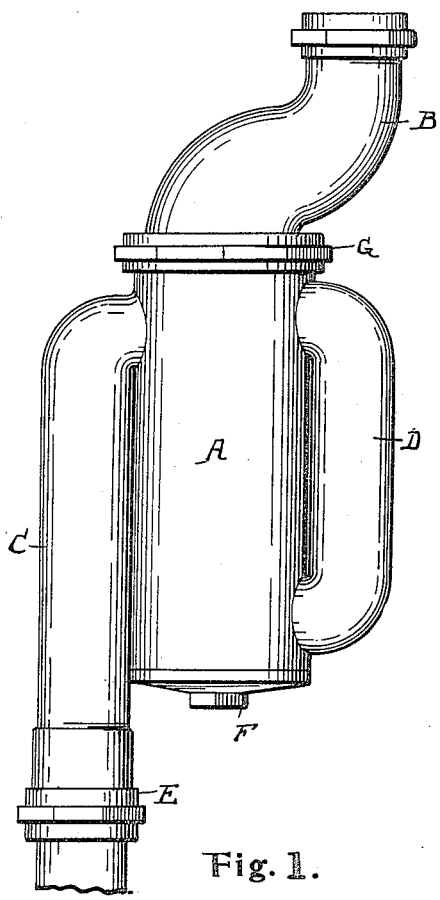
Figure 2:
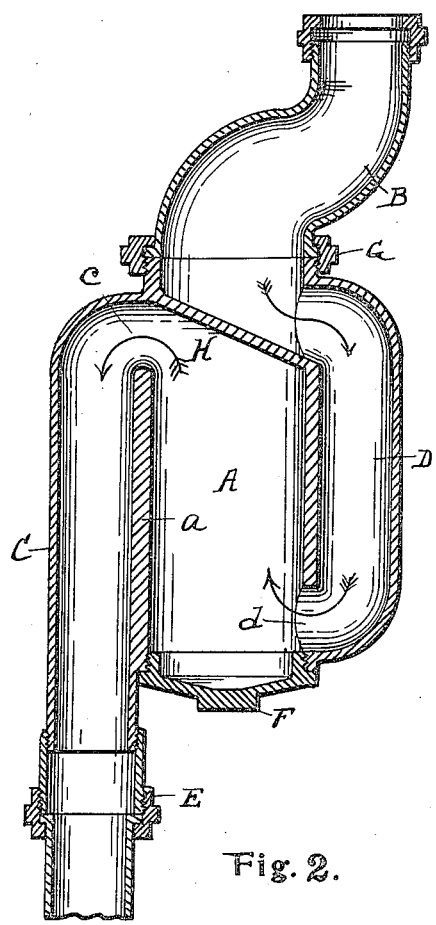
Figure 3:
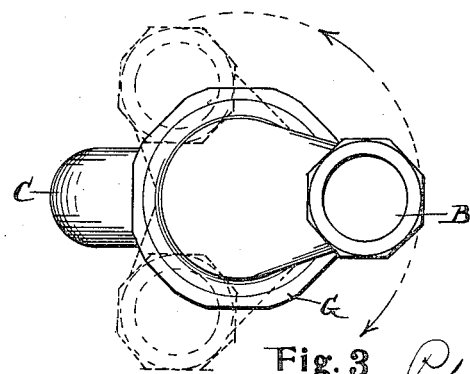

In the drawings,—Figure 1, is a vertical perspective view of the trap assembled, showing the outside relation of the various parts. Fig. 2, is a vertical central section of Fig. 1. Fig. 3, is a top plan view of Fig. 1, showing the adjustability of the connections.

Similar letters refer to similar parts.

In the drawings A represents the barrel of the trap; B is the goose-neck attached to A by means hereinafter described.

C is the outlet pipe or passage; D is a conduit or passage from the goose-neck B into the body of the trap A; E is the connection to which the waste pipe is made; F is the screw-cap attached to the bottom of the barrel A and which may be removed for cleaning purposes.

The parts A, C, D, are preferably, although not necessarily, cast in one piece. To this piece the part B is connected by a swiveling coupling, hereinafter described, and the coupling is also attached for the purposes of connecting with the waste pipe and the screw-cap F; this constitutes the entire number of pieces of this apparatus.

The goose-neck B is made as represented with an offset and is connected by swiveling coupling G to the barrel A. This swiveling coupling is in the usual form and enables the goose-neck B to be set and fastened at an angle to the barrel A, whereby it can be made to adjust within the range of its offset or connection with the trap to various other connections that may not happen to be in line with the discharge pipe, and this feature insures the making of the joints free from strain or leakage.

In the interior of the barrel A, at its upper end, is an angular partition H, which is cast integral with the barrel itself and is, of course, water-tight. It divides the barrel A into two chambers, the upper one of which is much smaller than the lower one by reason of its forming an angular bottom of the upper chamber it becomes the bottom of a passageway for the liquids received from the goose-neck B and deflects those liquids into the said conduit or by-pass D which opens at *d*, into the body of the barrel A; this constitutes comparatively a large chamber and is intended as a sealing chamber; the bottom of the chamber in the barrel A is closed, as already stated, by the removable cap F. The side wall *a*, of the barrel A forms a partition between the interior of the barrel A and the discharge conduit C which opens into the barrel A through an orifice of substantially the same size at *c*.

It will be noted that the goose-neck B enlarges from a diameter at the top, which is substantially the same as the diameter of the outlet C and the bypass D, to a diameter which is equal to the diameter of the barrel A. This enlargement forms an air pocket and serves to break the water column, as it is obvious that the water descending through the intake pipe and through the upper portion of the goose-neck, will be broken from the solid column as it descends through the enlarged portion of the goose-neck and the upper portion of the barrel, as there is no other pressure upon it than the normal atmospheric pressure. This will leave an air space in the upper chamber of the barrel A and the enlarged portion of the goose-neck. This air pocket plays an important part in resisting the tendency of the trap to siphon out its contents and impair the seal, for as the water through the intake diminishes in flow, the air from this air pocket passes down the by-pass D and passes through the opening *d* into the barrel A and breaks the siphonic action. This air pocket also forms a useful feature in the lavatory trap, for it prevents "air-binding," a fault that occurs in connection with lavatory traps, but not with bath tub traps and is manifest when the water in the lavatory basin refuses to flow through the outlet. But by placing the finger or some instrument in the outlet, the "air-bind" may be broken and the water will flow down in its normal way. With my trap it is impossible for "air-binding"

to occur for the reason that the water column through the goose-neck B and the by-pass D is broken by the enlargement.

The operation of this device is as follows, the arrows showing the direction in which the fluids discharge. A rush of liquid coming through B strikes the deflecting partition H, is deflected into the side conduit D and enters the bottom of the barrel A at $d$, filling this it rises and passes through the orifice $c$ into the discharge pipe $c$. It will be noted that it necessarily stirs up all of the sediment or substantially all of the sediment in the barrel A, and sweeps it over through the orifice $c$ into the outlet; as, however, the discharge through the inlet B ceases, C siphons over the contents until the air level gets below the upper side of the opening $d$; air from the air pocket then instantly rises in the barrel A passes along upwardly ascending the partition H to the top of the orifice $c$ and breaks the siphon leaving the barrel A substantially full of liquid which immediately becomes quiescent and settles to its proper level in both the barrel A and the discharge D, constituting a seal to the upward passage of gases through the outlet pipe C.

Having thus described my invention what I desire to claim is:

A lavatory trap, having in combination, a deep barrel, an inclined partition across the barrel near the top dividing the barrel into an upper and lower chamber, a lead-around conduit of considerably less diameter than the barrel and cast integral with the barrel, said lead-around conduit leading from the upper chamber to the outside of the barrel there paralleling and lying contiguous to the barrel and leading into the lower chamber at the side and flush with the bottom thereof, an outlet conduit of substantially the same bore as the lead-around conduit, cast integral with the said barrel and leading from the side of the barrel at the extreme top of the lower chamber and paralleling the said barrel contiguous thereto, and a goose-neck having an inlet opening of substantially the same bore as the said conduits and enlarging to a bore coincident to the bore of the barrel, the said enlarged end of the gooseneck having a swiveling coupling with the barrel at its top, whereby the swiveling goose-neck provides a large range of adjustability for the trap and also affords an air trap to break siphonic action, substantially as described.

In testimony whereof, I sign this specification in the presence of two witnesses.

PETER D. HAY.

Witnesses:
R. A. PARKER,
N. V. BELLES.